Jan. 31, 1956  R. F. ADKISSON  2,732,791
BALE REGULATOR
Filed Dec. 8, 1954  6 Sheets-Sheet 1

FIG. I

Robert F Adkisson
INVENTOR.
BY Loyal J Miller
ATTORNEY

R. F. ADKISSON 2,732,791

BALE REGULATOR

Filed Dec. 8, 1954

Robert F. Adkisson,
INVENTOR.

BY Loyd J. Miller,
ATTORNEY

United States Patent Office 2,732,791
Patented Jan. 31, 1956

2,732,791

BALE REGULATOR

Robert F. Adkisson, Verden, Okla.

Application December 8, 1954, Serial No. 473,864

9 Claims. (Cl. 100—4)

The present invention relates to hay balers, and more particularly to hay balers of the self-tying type in which the bales are automatically tied when a predetermined amount of hay has been compressed within the bale box.

This invention is an improvement over a patent issued to me on July 25, 1950, No. 2,516,742. The said patent was designed to be applied to one particular model of a particular make of baler. Whereas, the present invention is designed to be used on all models of that type of baler as well as on other models of self-tying balers.

On the balers which are in use today, which are equipped with automatic tying mechanism that is actuated by movement of hay being compressed within the bale box, the weight of bales is governed by means in the bale box for partially choking the bale box exit. This choking mechanism acts to control the tightness with which the hay is compressed within the bale box and its adjustment consequently regulates the tightness of the tied bale. The length of the bale in an automatic bale-tying baler is regulated by a metering wheel installed at one side of the baler in contact with the hay, which actuates or trips the bale tying mchanism. When it is desired to obtain a lighter weight bale with conventional equipment, the choking mechanism is adjusted to keep the hay from being tightly compressed. This results in a bale of approximately the same length as a tightly compressed hay bale but in this instance the hay within the bale is very loosely packed and is undesirable because a bale so made more easily falls apart upon handling. With hay balers using automatic bale tying mechanism installed and controlled in a conventional manner, the bales produced often vary in length as much as 6 inches or more. Such variation in length is not desirable, but is caused by a wad of hay being compressed into the bale box at the time the tying mechanism is actuated, thus creating a longer and heavier than standard bale. The next bale is then shorter and lighter since it does not receive its quota of hay. This is caused by the fact that the usual or conventional metering wheel, as used on the bale box, is not disengaged and reset at a selected starting point each time the bale tying operation takes place.

The present invention overcomes these objections by providing a device which may be installed on most conventional automatic bale tying balers, which will selectively regulate the length of the bales by resetting the metering wheel to a predetermined setting for actuating the bale tying tripping mechanism after each bale is tied.

Therefore, the principal object of this invention is to provide selectively adjustable mechanism for controlling the operation of the bale tying mechanism.

Another object of this invention is to provide an adjustable mechanism which when once set will thereafter work automatically in providing bales of a selected length.

Another object of this invention is to provide a device for this purpose which may be easily and quickly adjusted to produce bales of a selected length.

A further object is to provide an adjustable device for the purposes set forth, such mechanism being so designed that it may be operatively installed on balers without remodification of the present conventional bale type apparatus.

An additional object of this invention is to provide a device of this class which is simple in construction, easily installed and which has few moving parts to become worn or get out of order.

The present invention accomplishes these and other objects by providing a diametrically slightly larger ratchet driven metering wheel rotatably installed upon or with the conventional metering-wheel rod and is connected to the bale tying apparatus by a chain and sprocket which resets the trigger mechanism for tripping the tying apparatus each time a bale has been tied.

The present invention further provides for adjustable setting for regulating the length of bales by utilizing a pin selectively positioned in perforations which is actuated by a pawl to rotate the shaft and trigger tripping mechanism.

Other objects will be apparent from the following description when taken in conjunction with the accompanying six sheets of drawings, wherein:

Figure 8 is an exploded perspective view, illustrating the working parts of the ratchet-driven metering wheel; and, Figure 9 is a perspective view of the bottom of the metering wheel.

Like characters of reference designate like parts in those figures of the drawings in which they occur.

In the drawings:

Figure 1:
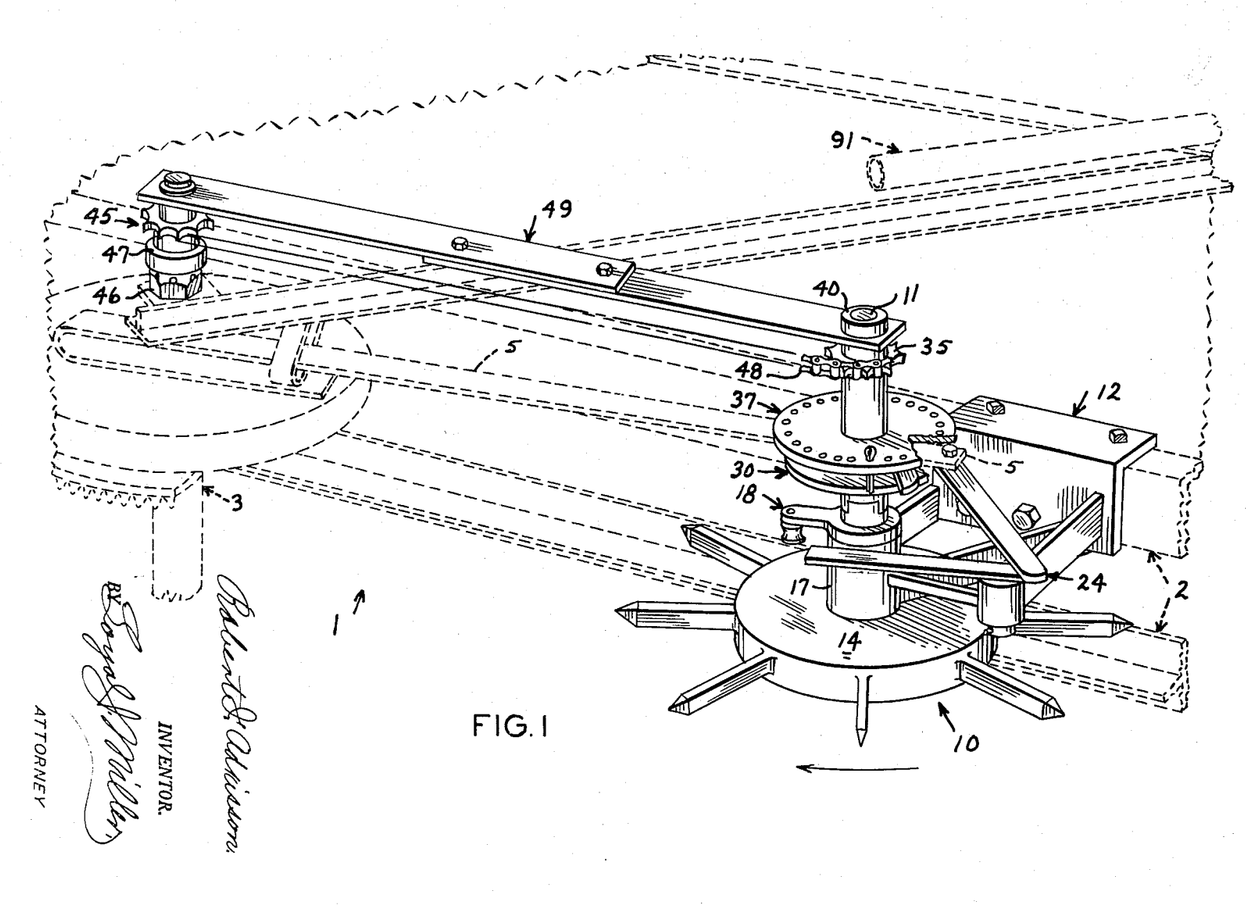
Figure 1 is a perspective view of one embodiment of the device as installed upon the bale box of a hay baler as shown in dotted lines.

Referring now more particularly to Fig. 1, the reference numeral 1 indicates, as a whole, a fragment of one type of conventional hay baler, shown in dotted lines, and which includes a hollow bale box 2 within which hay is compressed. The upper end portion of an automatically operated bale tying apparatus which is connected to one side of the bale box 2 is indicated generally by the reference numeral 3. The operation of the tying apparatus is started by the movement of a trigger arm 5 eccentrically connected to the conventional metering wheel, not shown, which is rotated by the rearwardly moving hay within the bale box, to move the trigger arm 5. The arrangement is such that when the metering wheel is rotated through approximately one complete revolution, the trigger arm 5 is moved and the bale tying apparatus is released for one cycle of its operation. The mechanism of the present invention is designed to operate in lieu of the conventional metering wheel for tripping the bale tying apparatus of automatic bale tying balers and operates in conjunction with the trigger arm 5.

In carrying out the present invention, an improved or ratcheting metering wheel 10 is rotatably mounted on a shaft 11 at the side of the bale box 2 by a suitable bracket 12 to position the metering wheel 10 in substantially the same position as the conventional metering wheel, not shown, is positioned. The shaft 11 is substantially parallel with relation to the longitudinal axis of the tying apparatus 3. The metering wheel 10 has radially spaced-apart fingers 13 or spikes connected at one end of the body 14 of the metering wheel and projecting outwardly slightly larger diametrically with relation to a conventional metering wheel. The fingers 13 project or extend horizontally into the bale box 2 through a horizontal slot in the side of the bale box and are contacted by the hay which rotates the metering wheel as the hay moves rearwardly through the bale box. As shown more clearly in Fig. 2, the metering wheel 10 has a cylindrical body 14 and an upwardly projecting hub 15 which is rotatably journalled on the shaft 11. The bracket 12 has a centrally bored bearing 17 which rotatably journals the hub 15. The hub 15 projects through the bearing 17 and is secured therein by an eccentric 18 which is bored for surrounding the hub and is fastened thereto by set screws 19. The eccentric 18 has a roller 20 connected to its outermost end for the purposes more fully explained hereinbelow. The upper end of the hub 15 is notched to define longitudinally projecting lugs, as at 21, for the purposes more fully explained hereinbelow.

Figure 2:
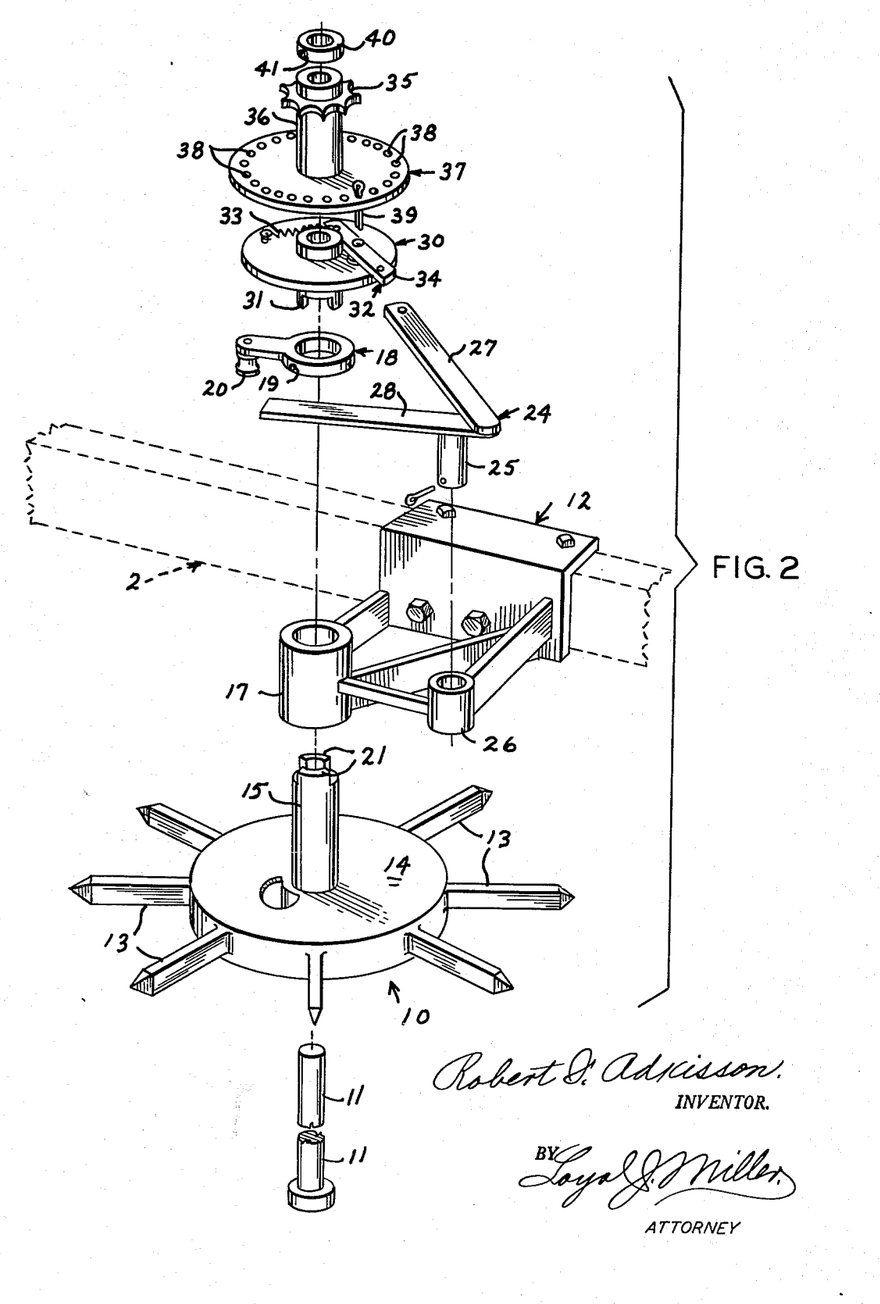
Figure 2 is an exploded perspective view of the device as shown in Fig. 1, showing the relationship of the working parts thereof.

A bell crank 24 is pivotally connected to the bracket 12 by a pivot pin 25 disposed within a pivot block 26 of the bracket. The arms 27 and 28 of the bell crank extend horizontally from the pivot pin 25 and are disposed in spaced-apart relation on opposite sides of the hub 15. The free end of the arm 27 is pivotally connected to the end of the trigger arm 5 (Fig. 1). When the bale tying apparatus is at rest the trigger arm and the arm 27 of the bell crank remain adjacent the side of the bale box 2, as illustrated in Fig. 1. As the metering wheel is rotated in the direction shown by the arrow (Fig. 1), the roller 20 of the eccentric 18 contacts the arm 28 and moves the arm 27 and the trigger arm 5. The arc of this movement, using the pivot pin 25 as the center, is such that the trigger arm 5 is moved longitudinally a sufficient distance to trip and start the operation of the bale tying apparatus. It seems evident that the eccentric 18 must rotate a complete revolution to contact the arm 28 for tripping the tying apparatus, unless the eccentric is selectively positioned after each revolution to lessen the distance it has to travel before again contacting the arm 28. The present invention accomplishes this resetting of the metering wheel by providing a disk 30 of a selected size rotatably journalled on the shaft 11 above the eccentric 18 by projecting from each side of the disk, respectively. The lower end of the hub 31 is notched to define longitudinally extending lugs for co-operative engagement with the lugs 21 of the metering wheel. A pawl or arm 32, preferably of strap metal, is pivotally connected flatly medial its ends to one surface of the disk 30. A spring 33 is anchored at one end to the surface of the disk 30 and is connected at its other end to one end of the pawl 32. The pawl or arm 32 is preferably of a length to enable the spring 33 to resiliently hold one end portion of the pawl in contact with the hub 31 and to allow the free or opposite end of the pawl to extend outwardly beyond the periphery of the disk 30 a selected distance, as is illustrated in Figs. 1 and 2. One end corner of the pawl 32 is ground off, as at 34, to provide a rounded corner for the purposes more fully explained hereinbelow.

A sprocket 35 is rotatably mounted on the shaft 11 by an elongated hub 36. The sprocket 35 is rigidly connected to the hub 36 adjacent one end thereof, and integrally connected to the opposite end of the hub 36 is a second disk 37 disposed in parallel relation with the sprocket 35. Adjacent its periphery the disk 37 has a plurality of radially spaced-apart perforations 38, for the purposes more fully explained hereinbelow. A pin or large cotter key 39 is placed in a selected one of the perforations 39 and extends therethrough a sufficient distance to engage one edge of the pawl 32 and rotate the disk 30 when the disk 37 is rotated in one direction by the bale tying apparatus. The rounded corner 34 on the pawl 32 is a safety feature to allow the pawl 32 to pivot and pass the pin 39 to prevent damage to the resetting device upon failure of the bale tying apparatus. The pin 39 is positioned in a selected one of the perforations 38 to be engaged by the pawl 32 for radially positioning the eccentric 18. Thus, the length of the bale may be shortened by moving the location of the pin 39 in one direction and the bale may be lengthened by moving the location of the pin 39 in the opposite direction, since the setting of the pin 39 determines the radial positioning of the eccentric 18. In other words, the eccentric 18, which acts to trip the tying apparatus, may be selectively radially positioned relative to the arm 28 by placing the pin 39 in the proper one of the perforations 38.

A stop ring 40 is axially connected to the end of the shaft 11 by suitable set screws 41 to retain the above described elements in co-operative relation on the shaft.

Referring now more particularly to Fig. 1, the conventional nut, not shown, at the top of the tying apparatus 3 is replaced by a sprocket 45 having a suitable nut 46 rigidly connected axially to the hub 47 of the sprocket 45. The sprockets 35 and 45 are diametrically substantially equal. The nut 46 is threadedly engaged with the top of the tying apparatus 3 in lieu of the conventional nut and rotates the sprocket 45 as the tying apparatus is actuated. A chain 48 drivably connects the two sprockets 35 and 45. A longitudinally adjustable strap metal brace 49 is connected adjacent one end through a suitable perforation to the hub of the sprocket 45 and is similarly perforated adjacent its opposite end to engage the shaft 11 above the sprocket 35 and below the stop ring 40. The purpose of the brace 49 is to rigidly maintain the parallel relationship of the shaft 11 with relation to the longitudinal axis of the tying apparatus 3.

Figures 8, 9:
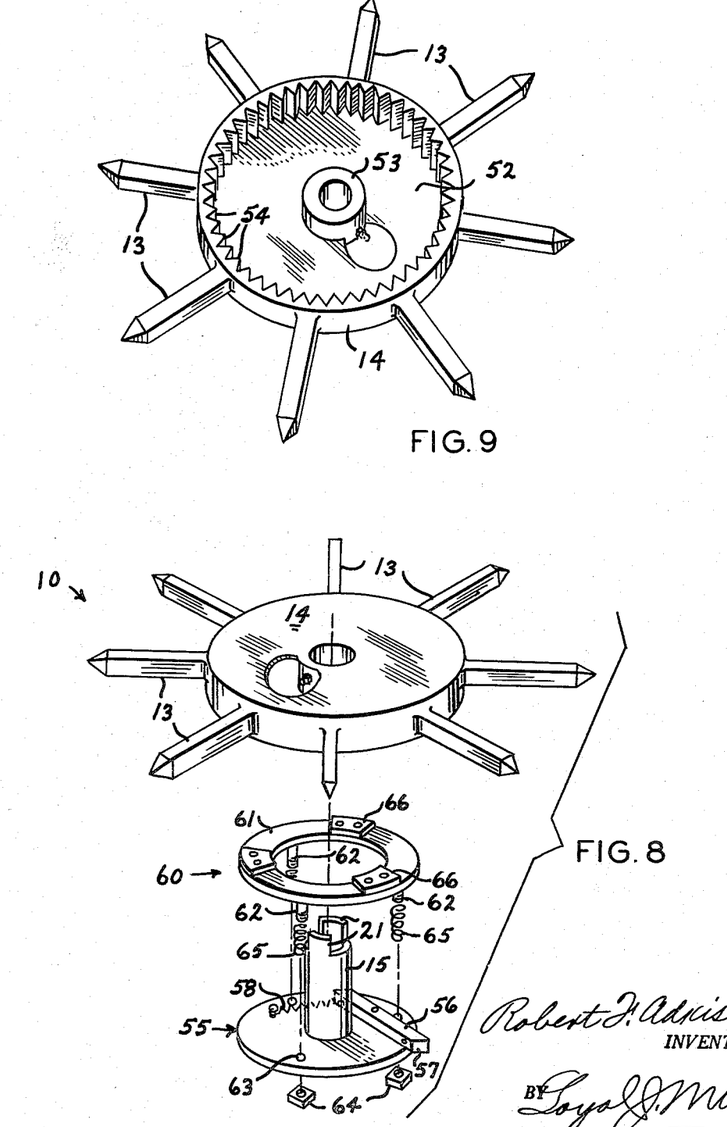

As illustrated more clearly in Figs. 8 and 9, the disk-like body or cylinder 14 of the metering wheel 10 is formed with a recess 52 defined centrally by a hub 53 and radially by a plurality of ratchet teeth 54. The hub 53 is centrally bored to receive the hub 15 which is journalled on the shaft 11, as described hereinabove. A disk or plate 55 is rigidly connected axially to the end of the hub 15 opposite the lugs 21. The plate 55 is preferably substantially smaller diametrically than the body 14. A ratchet pawl 56 is pivotally connected medially its ends at a selected point on one surface of the plate 55. The ends of the pawl 56 are beveled, as at 57, for engagement with the teeth 54. A spring 58 has one end connected to the surface of the plate 55 and its opposite end connected to one end of the pawl 56 to urge the opposite end of the pawl outwardly beyond the periphery of the plate 55 and into contact with the teeth 54. When the metering wheel 10 is rotated in one direction by the passage of hay within the bale box, the pawl 56 engages one of the teeth 54 and rotates the hub 15 and the plate 55 in the same direction, thus rotating the eccentric 18 (Figs. 1 and 2) to trip the tying apparatus, as disclosed hereinabove. When the hub 15 is rotated in the opposite direction by the action of the chain from the tying apparatus, the pawl 56 ratchets against the teeth 54 to allow the hub 15 and the eccentric 18 to be selectively positioned with relation to the metering wheel 10, for the purposes more fully explained hereinbelow. To insure the positive positioning of the ratchet pawl 56 in the same position with relation to the metering wheel 10 each time the bale tying apparatus repositions the eccentric 18, a brake 60 is provided to stop the rotative momentum of the hub 15 and the plate 55.

The brake 60 includes a plate or ring 61 having a diameter substantially equal with relation to the plate 55. Three radially spaced bolts 62 are rigidly connected perpendicularly to the lower surface of the ring 61 and pass through co-operatively disposed perforations 63 in the plate 55. Nut 64 threadedly engaged with the bolts 61 is to frictionally engage the under side of the body 14. An expansion spring 65 is disposed around each bolt 62 between the ring 61 and the plate 55 to urge the ring away from the plate and insure positive contact of the upper surface of the ring with the body. To increase the frictional resistance between the ring 61 and the body 14, the upper surface of the ring is provided with rigidly connected brake blocks 66 which may be three blocks, as shown in Fig. 8, or a continuous ring equal in width with relation to the ring 61 if it is desired to increase the frictional resistance further. Thus is seems evident that the drag of the brake blocks 66 on the under surface of the body 14 will tend to keep the plate 55 from rotating beyond the desired setting as the eccentric 18 is repositioned.

Figures 3, 7:
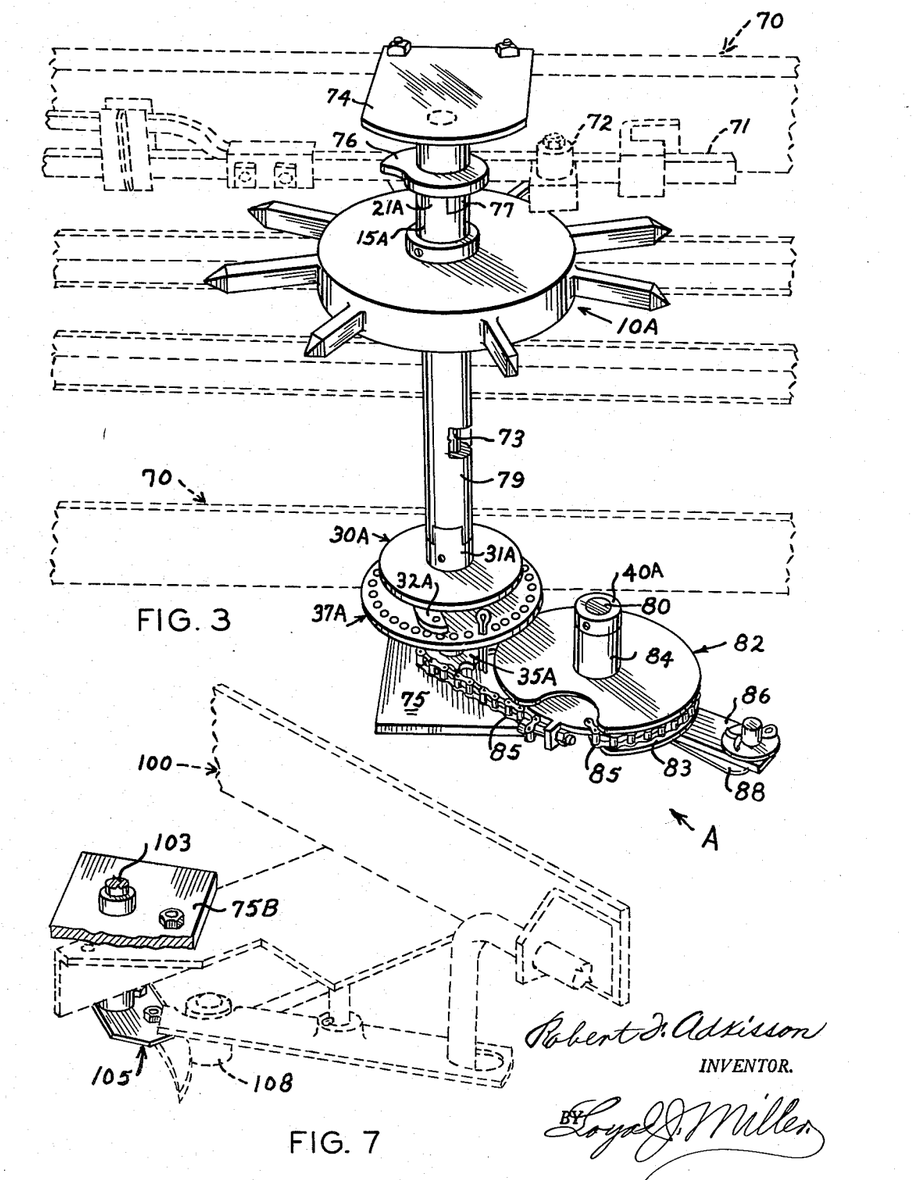
Figure 3 is a perspective view similar to Fig. 1, showing another embodiment of the device installd on a different type bale box, as illustrated in dotted lines.
Figure 7 is a perspective view of the lower part of Fig. 6, illustrating the trigger tripping mechanism for actuating the tying apparatus.
Figures 4, 5:
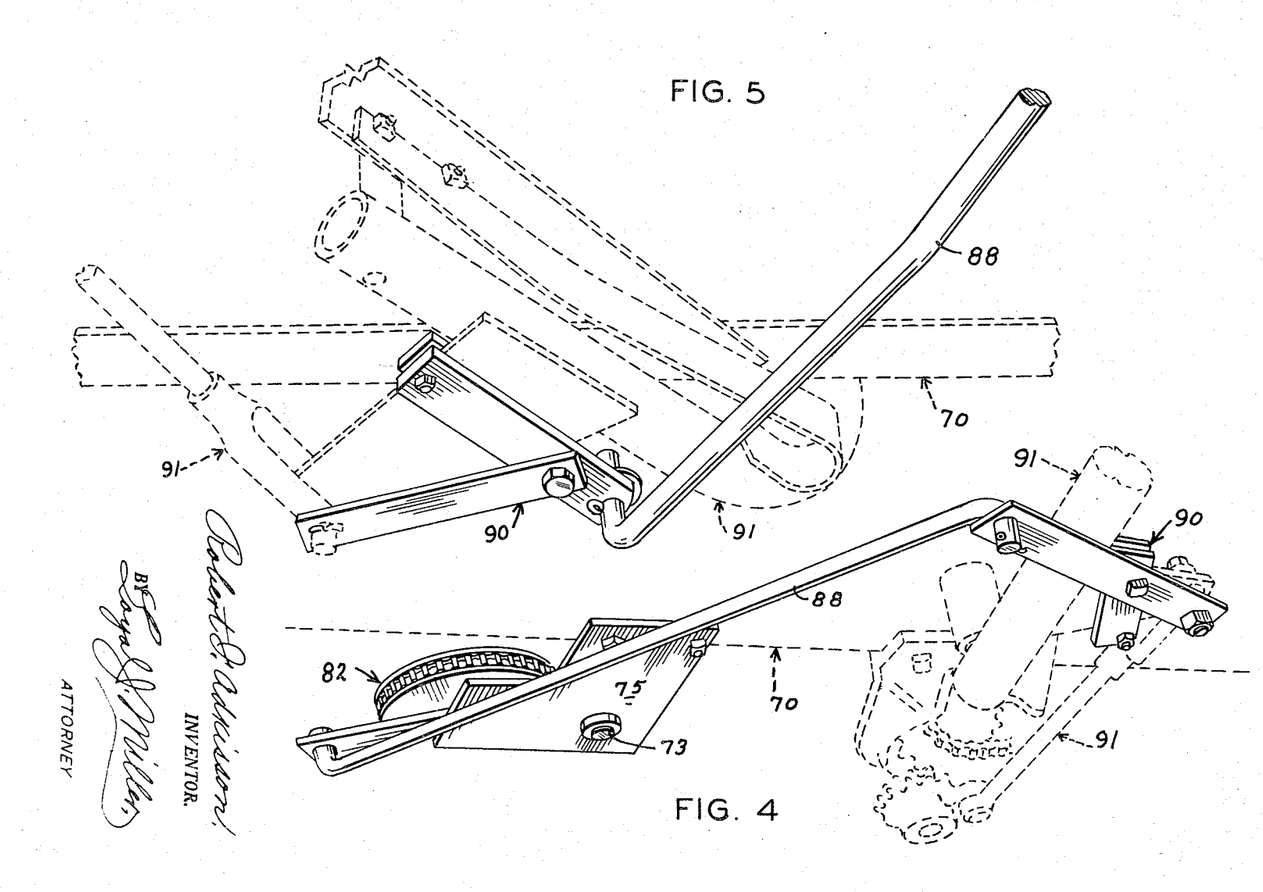
Figure 4 is a perspective view of the lower part of the device as shown in Fig. 3, illustrating the means of connection with the bale tying apparatus, as shown in dotted lines.
Figure 5 is a perspective view similar to Fig. 4, detailing the means of connecting the bale tying aparatus to the present invention.

Figure 3 illustrates an alternate embodiment of the bale regulating apparatus, indicated generally by the letter A, and installed on a different model of an automatic tying baler. A fragmentary portion of the bale box 70 is shown in dotted lines and which is similarly constructed as is the bale box 1, as described hereinabove. The box 70 has a longitudinally extending tripper rod 71 which trips the tying apparatus for one cycle of operation upon longitudinal movement of the rod. The tripper rod 71 carries a lug 72 which is contacted by an eccentric upon each revolution of the metering wheel, as will be presently apparent. A metering-wheel shaft replaces the original shaft and is rigidly mounted vertically adjacent the bale box 70 by an upper and a lower plate-like support bracket 74 and 75, respectively. The improved metering wheel 10A is rotatably mounted on the shaft 73 in substantially the same position as was the original wheel, not shown. An eccentric 76 is rotatably mounted on the shaft 73 between the metering-wheel hub 15A and the bracket 74. The eccentric 76 has a hub 77 which is co-operatingly notched for engagement with and to be driven by the notches 21A of the metering wheel. The plate 37A and its associated sprocket 35A are inverted and rotatably mounted on the shaft 73 adjacent the lower bracket 75. Similarly the plate 30A and pawl or pivot arm 32A are inverted and rotatably installed on the shaft 73 above the plate 37A. A tubular sleeve 79, having its upper end rigidly connected to the lower surface of the metering-wheel plate and its lower end co-operatingly notched for engagement with the hub 31A, acts as a connector to rotate the plate 30A as the metering wheel 10A revolves. A vertically disposed axle 80 has its lower end rigidly connected to the upper surface of the bracket 75. A resetting wheel 82, having a grooved periphery 83, is rotatably axially mounted on the axle 80 by its hub 84, thus positioning the groove 83 in horizontal alignment with the sprocket 35A. The stop ring 40A acts to hold the wheel 82 on the axle 80. A chain 85, of a selected length, has both ends rigidly connected to the periphery of the wheel 82 and is disposed within the groove 83 and drivably envelops the sprocket 35A. The purpose of the resetting wheel 82 is to reset the eccentric 76 after each tying operation of the baler. Diametrically the resetting wheel 82 is substantially larger than the sprocket 35A so that a partial revolution of the wheel 82 will make a complete revolution of the sprocket 35A. Accordingly an arm or lever 86 is rigidly connected at one end to the lower surface of the wheel 82 and projects laterally therefrom a selected distance. To the free end of the arm 86 is pivotally connected, through a suitable perforation, a connector rod or link 88 (Figs. 3, 4 and 5) which is pivotally connected at its opposite end by suitable strap-metal brackets 90 to the needle arm 91 of the baler. Thus it seems evident that, as the bale tying apparatus is tripped by the action of the eccentric 76 moving the tripper arm 71, the movement of the needle arm 91 in turn moves the connector rod 88 rotating the resetting wheel 82 and the plate 37A which resets the eccentric 76 in a selected position in a similar manner, as disclosed hereinabove for the embodiment shown in Figs. 1 and 2, and without moving the metering wheel 10A which remains in contact with the hay within the bale box.

Figure 6:
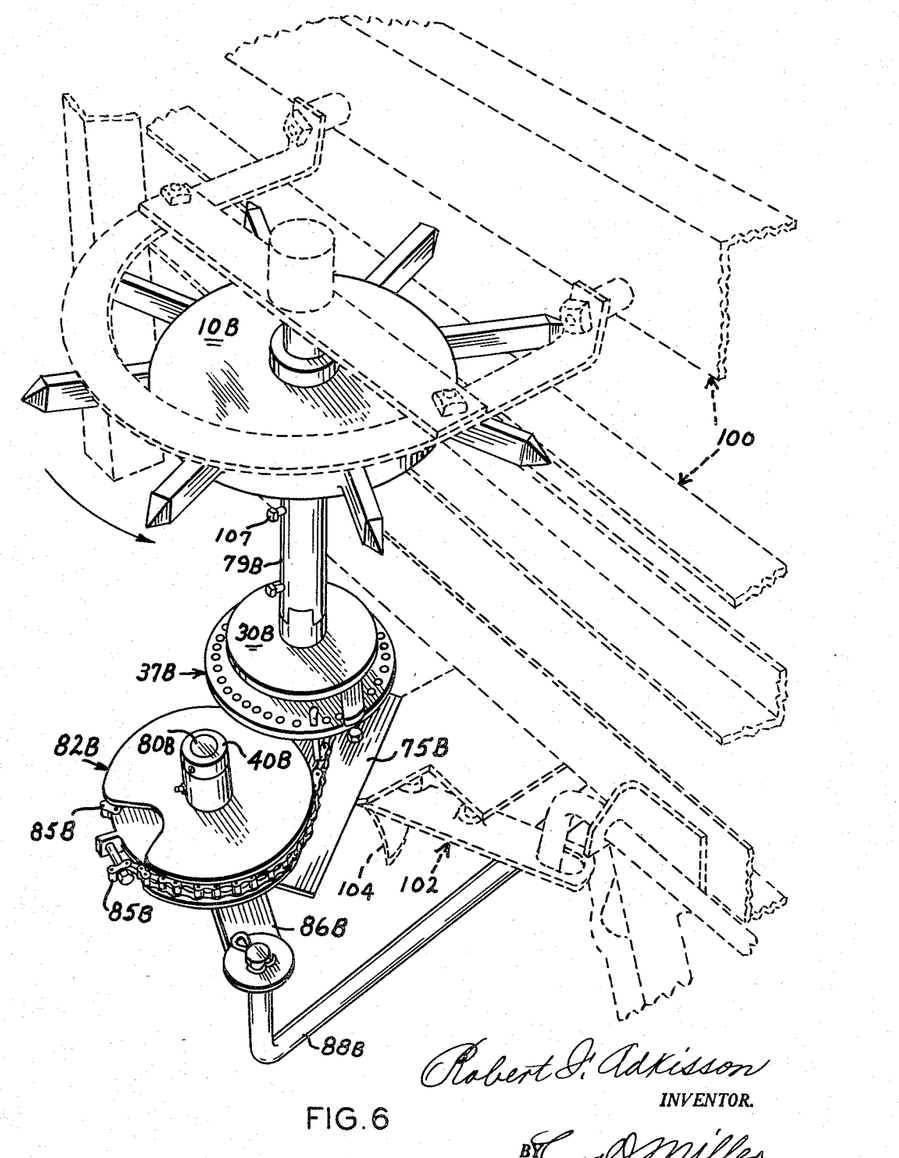
Figure 6 is a perspective view similar to Figs. 1 and 3, illustrating another embodiment of the device as installed on yet a different type of bale box.

Figure 6 illustrates yet another type of automatic tying baler having a similarly constructed bale box 100 and bale tying tripping mechanism 102 disposed adjacent the lowermost edge of the bale box, and on which the bale regulating device shown in Fig. 3 has been installed with slight modification. In this embodiment, indicated generally by the reference letter B, the metering-wheel shaft 103 (Fig. 7) must revolve to actuate the eccentric 104 which trips the bale tying mechanism 102. The shaft 103 extends downwardly below the support bracket 75B a sufficient distance to carry a rigidly connected plate 105 which is bolted to the eccentric 104. The connector sleeve 79A is rigidly connected to the shaft 103 by set screws 107 to insure positive rotation of the shaft 103 by the metering wheel 10B. Rotation of the metering wheel 10B rotates the shaft 103 and the tying mechanism is tripped by the eccentric 104 contacting the lug 108, thereafter the operation of the embodiment of the device, as shown in Fig. 6, is actuated by the connector rod or link 88B in a similar manner, as disclosed hereinabove for the embodiment shown in Fig. 3.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A metering wheel for an automatic tying hay baler, comprising: a horizontally disposed cylinder centrally bored, having a recess in its lower surface defining a central hub and a peripheral wall; a plurality of radial teeth on the inner surface of said wall; a plurality of horizontal spikes projecting radially outwardly, one end of each spike integrally connected to the periphery of said cylinder; a pair of superposed centrally bored adjustably spaced-apart plates centrally disposed axially within the recess of said cylinders; spring means for urging the plates apart and frictionally engaging the uppermost of said plates within the recess of said cylinder; a pawl pivotally mounted intermediate its ends on the upper surface of the lowermost of said plates; and a pawl spring urging an end of said pawl to engage said teeth, causing said end of said pawl to ratchet against said teeth as said cylinder is rotated in one direction and said end of said pawl to wedge against one of said teeth for rotating said superposed plates with the cylinder, when said cylinder is rotated in a direction opposite to the first said direction.

2. A metering wheel for an automatic tying hay baler, comprising: a horizontally disposed centrally bored cylinder having a recess in its lower surface defining a central hub and a peripheral wall; a plurality of vertically disposed radial teeth on the inner surface of said wall; a plurality of horizontal spikes projecting radially outwardly, one end of each spike integrally connected to the periphery of said cylinder; a disk concentrically disposed within the recess of said cylinder in radially spaced-apart relation with said teeth, said disk having a centrally bored hub axially disposed within the bore of said cylinder; a pawl pivotally mounted intermediate its ends on the upper surface of said disk; and a pawl spring urging an end of said pawl to engage said teeth, causing said end of said pawl to ratchet against said teeth as said cylinder is rotated in one direction and to wedge against one of said teeth for rotating said disk with the cylinder when said cylinder is rotated in a direction opposite to the first said direction.

3. A metering wheel for an automatic tying hay baler, comprising: a horizontally disposed centrally bored cylinder having a recess in its lower surface defining a central hub and a peripheral wall; a plurality of vertically disposed radial teeth on the inner surface of said wall; a plurality of horizontal spikes projecting radially outwardly, integrally connected to the periphery of said cylinder; a disk concentrically disposed within the recess of said cylinder in spaced-apart radial relation with said teeth, said disk having a centrally bored hub axially disposed within the bore of said cylinder; a ring concentrically disposed within the recess of said cylinder in spaced-apart relation above said disk, said ring substantially equal diametrically with relation to said disk; adjustable connections between said disk and said ring for varying their spaced-apart relation; spring means for urging the said ring upwardly from said disk for frictionally engaging the upper surface of said ring with the recess of said cylinder; a pawl pivotally mounted intermediate its ends on the upper surface of said disk; and a pawl spring urging an end of said pawl to engage with said teeth, causing one end of said pawl to ratchet against said teeth as said cylinder is rotated in one direction and to wedge against one of said teeth and to rotate said disk and said ring with the cylinder when said cylinder is rotated in a direction opposite to the first said direction.

4. Structure as specified in claim 1 in which the hay baler structure includes a bale box within which hay is compressed, and apparatus for mechanically tying the compressed hay in bales, said apparatus including a movable trigger-arm for starting the operation of the tying apparatus by the movement of the arm; and a shaft mounted adjacent said bale box for journaling said metering wheel, the radial spikes of said wheel engaging with the hay within said bale box for rotating said wheel by the movement of the hay; a bell-crank pivotally mounted adjacent the hub of said wheel, said crank having one arm connected to said trigger-arm; an eccentric carried by the hub of said wheel for contacting and pivoting said bell-crank and moving the trigger-arm to starting position when the hub and eccentric are rotated by said wheel; and adjustable means for selectively regulating the distance said eccentric must travel before moving said bell-crank and said trigger-arm to starting position.

5. Structure as specified in claim 1 in which the hay baler structure includes a bale box within which hay is compressed, and apparatus for mechanically tying the compressed hay in bales, said apparatus including a movable trigger-arm for starting the operation of the tying apparatus by the movement of the arm; and a shaft mounted adjacent said bale box for journaling said metering wheel, the radial spikes of said wheel engaging with the hay within said bale box for rotating said wheel by the movement of the hay; a bell-crank pivotally mounted adjacent the hub of said wheel, said crank having one arm connected to said trigger-arm; an eccentric carried by the hub of said wheel for contacting and pivoting said bell-crank and moving the trigger-arm to starting position when the hub and eccentric are rotated by said wheel; and adjustable means for selectively regulating the distance said eccentric must travel before moving said bell-crank and said trigger-arm to starting position, said adjustable means including: a first disk having a hub journaled by said shaft, the hub of said first disk drivably engaging with the hub of said wheel for rotating therewith; a pivot arm pivotally mounted on one surface of said first disk; a pivot arm spring urging an end of said pivot arm outwardly beyond the periphery of said first disk; a first sprocket journaled by said shaft; a second disk interposed between said first disk and said first sprocket and integrally connected to the hub of said first sprocket, said second disk having a plurality of radial perforations adjacent its periphery, said second disk being larger diametrically than the first said disk; a pin carried by one of the perforations of said second disk and projecting therebeyond for engaging with the outwardly disposed end of said pivot arm, and rotating said first disk when said second disk is rotated in one direction; a second sprocket connected to one end of said tying apparatus and rotatable therewith, and a chain drivably connecting both said sprockets, whereby said tying apparatus rotates said second disk engaging said pivot arm with said pin for resetting said eccentric to a predetermined starting position each time the tying apparatus is actuated.

6. Structure as specified in claim 1 in which the hay baler structure includes a bale box within which hay is compressed, and apparatus for mechanically tying the compressed hay in bales, said apparatus including a movable lug-carrying tripper-rod for starting the operation of the tying apparatus by the movement of the rod: and a support rigidly mounted on the upper and lower surface, respectively, of said bale box and projecting laterally therefrom a shaft extending between and rigidly connected to said supports for rotatably journaling the hub of said metering wheel, the radial spikes of said metering wheel engaging with the hay within said bale box for rotating said wheel by the movement of the hay; an eccentric journaled by said shaft above said wheel, said eccentric having a driving connection with the hub of said metering wheel and co-acting with the lug on said tripper-rod for moving the same to starting position by the rotation of said wheel; and adjustable means for regulating the distance said eccentric must travel before moving the lug and said tripper-rod to starting position.

7. Structure as specified in claim 1 in which the hay baler structure includes a bale box within which hay is compressed, and apparatus for mechanically tying the compressed hay in bales, said apparatus including a movable lug-carrying tripper-rod for starting the operation of the tying apparatus by the movement of the rod: and a support rigidly mounted on the upper and lower surface, respectively, of said bale box and projecting laterally therefrom; a shaft extending between and rigidly connected to said supports for rotatably journaling the hub of said metering wheel, the radial spikes of said metering wheel engaging with the hay within said bale box for rotating said wheel by the movement of the hay; an eccentric journaled by said shaft above said wheel, said eccentric having a driving connection with the hub of said metering wheel and co-acting with the lug on said tripper-rod for moving the same to starting position by the rotation of said wheel; and adjustable means for regulating the distance said eccentric must travel before moving the lug and said tripper-rod to starting position, said adjustable means including: a first disk having a hub journaled by said shaft below said wheel, the hub of said first disk drivably connecting the hub of said metering wheel; a pivot arm pivotally mounted on one surface of said first disk; a pivot arm spring urging an end of said pivot arm outwardly beyond the periphery of said first disk; a sprocket journaled by said shaft below said first disk; a second disk interposed between said sprocket and said first disk, said second disk rigidly carried by the hub of said sprocket, said second disk having a plurality of radial perforations adjacent its periphery, said second disk being larger diametrically than the said first disk; a pin carried by one of the perforations of said second disk and projecting therebeyond for engaging the outwardly disposed end of said pivot arm and rotating said first disk when said second disk is rotated in one direction; a resetting wheel rotatably mounted on the lowermost of said supports adjacent said sprocket, said resetting wheel having a grooved periphery; a chain having both ends thereof connected to the periphery of said resetting wheel and disposed within the groove, said chain drivably contacting said sprocket; a lever rigidly connected at one end to one surface of said resetting wheel and projecting outwardly therefrom; and a link pivotally connecting the free end of said lever with said tying apparatus, whereby the action of said tying apparatus rotates said resetting wheel and said sprocket thereby rotating said first and second disks for resetting said eccentric to a predetermined starting position each time the tying apparatus is actuated.

8. Structure as specified in claim 1 in which the hay baler structure includes a bale box within which hay is compressed, said bale box having vertically aligned brackets extending laterally therefrom; apparatus for mechanically tying the compressed hay in bales, said apparatus including an eccentric for moving a trigger-arm for starting the operation of the tying apparatus upon movement of the arm; a support rigidly connected to the lower one of said brackets; a shaft journaled adjacent each respective end by said brackets for supporting said metering wheel and rotating therewith, the radial spikes of said wheel engaging with the hay within said bale box for rotating said wheel by the movement of the hay; the lowermost end of said shaft extending below said support and rigidly connected to said eccentric for moving said trigger-arm by the rotation of said metering wheel, and adjustable means for rotating said shaft and moving said eccentric to a predetermined starting position each time the tying apparatus is actuated.

9. Structure as specified in claim 1 in which the hay baler structure includes a bale box within which hay is compressed, said bale box having vertically aligned brackets extending laterally therefrom; apparatus for mechanically tying the compressed hay in bales, said apparatus including an eccentric for moving a trigger-arm for starting the operation of the tying apparatus upon movement of the arm; a support rigidly connected to the lower one of said brackets; a shaft journaled adjacent each respective end by said brackets for supporting said metering wheel and rotating therewith, the radial spikes of said wheel engaging with the hay within said bale box for rotating said wheel by the movement of the hay, the lowermost end of said shaft extending below said support and rigidly connected to said eccentric for moving said trigger-arm by the rotation of said metering wheel, and adjustable means for rotating said shaft and moving said eccentric to a predetermined starting position each time the tying apparatus is actuated, said adjustable means including: a first disk having a hub journaled by said shaft between said metering wheel and said support, the hub of said first disk drivably connected to the hub of said metering wheel; a pivot arm pivotally mounted on one surface of said first disk; a pivot arm spring urging one end of said arm outwardly beyond the periphery of said first disk; a sprocket interposed between said first disk and said support, said sprocket having a hub journaled by said shaft; a second disk rigidly carried by the hub of said sprocket between said first disk and said sprocket, said second disk having a plurality of perforations adjacent its periphery, said second disk being larger diametrically than the first said disk; a pin carried by one of the perforations of said second disk and projecting therebeyond for engaging with the outwardly disposed end of said pivot arm and rotating said first disk when said second disk is rotated in one direction; a resetting wheel rotatably mounted on the upper surface of said support adjacent said sprocket, said resetting wheel having a grooved periphery; a chain having both ends thereof connected to the periphery of said resetting wheel and disposed within the groove, said chain drivably contacting said sprocket; a lever rigidly connected at one end to one surface of said resetting wheel and projecting outwardly therefrom, and a link pivotally connecting the free end of said lever with said tying apparatus, whereby the action of said tying apparatus rotates said resetting wheel and said sprocket thereby rotating said first and second disks and said shaft for resetting said eccentric to a predetermined starting position each time the tying apparatus is actuated.

References Cited in the file of this patent

UNITED STATES PATENTS

| | | |
|---|---|---|
| 2,516,742 | Adkisson | July 25, 1950 |
| 2,620,724 | Berry | Dec. 9, 1952 |
| 2,701,517 | Hauswirth | Feb. 8, 1955 |